Dec. 24, 1940.   W. ARDITO   2,225,678
REFRIGERATION APPARATUS
Filed July 11, 1939   2 Sheets-Sheet 1

WITNESSES

INVENTOR
William Ardito.
BY
ATTORNEY

Dec. 24, 1940.                W. ARDITO                2,225,678
                        REFRIGERATION APPARATUS
                        Filed July 11, 1939         2 Sheets-Sheet 2

WITNESSES:                                    INVENTOR
                                            William Ardito
                                            BY
                                               ATTORNEY Patented Dec. 24, 1940

2,225,678

UNITED STATES PATENT OFFICE 2,225,678

REFRIGERATION APPARATUS

William Ardito, Springfield, Mass., assignor to Westinghouse Electric & Manufacturing Company, East Pittsburgh, Pa., a corporation of Pennsylvania Application July 11, 1939, Serial No. 283,765

6 Claims. (Cl. 62—103)

My invention relates to refrigerator apparatus and particularly to drip collectors for refrigerator evaporators of the type used, for example, in refrigerator display cases.

It is an object of my invention to provide an improved drip collector or drain baffle for the removal of condensate from a refrigerator evaporator.

It is another object of my invention to provide a drain baffle for an evaporator in which the fins are individually supported and retained by frictional engagement by a suitable supporting member.

It is another object of my invention to provide a drain baffle or drip collector in which, if the fins thereof break, it is only necessary to replace the broken fins instead of a whole section.

It is another object of my invention to substantially eliminate the factory assembly cost of drain baffles for evaporators.

It is still a further object of my invention to provide a drain baffle which is flexible as to size, the only change being necessary for different sizes being the change in size of the supporting members.

It is another object of my invention to provide drain baffles or drip collectors for evaporators and the like which are considerably cheaper to manufacture and assemble than heretofore.

These and other objects are effected by my invention as will be apparent from the following description and claims taken in connection with the accompanying drawings, forming a part of this application, in which:

Figure 1:
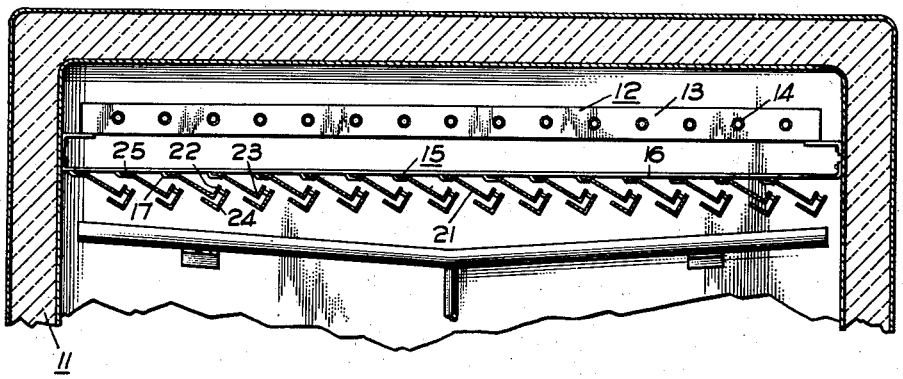
Fig. 1 is a partial sectional view of a refrigerator showing an evaporator, a drain trough, and a drip collector constructed in accordance with one embodiment of my invention.

Referring specifically to the drawings for a detailed description of the first embodiment of my invention, numeral 11 designates a heat insulated refrigerator cabinet containing a cooling element 12 embodying fins 13 and a refrigerant containing coil 14. The cooling element is of the type which collects condensate either in the form of moisture or frost. In the latter case, the cooling element 12 must be periodically defrosted and the condensate removed.

In either case, condensate from the cooling element 12 falls downwardly and is caught by a drip collector or drain baffle generally indicated at 15. The drain baffle 15 is so constructed that water does not pass downwardly therethrough but air may pass in either direction therethrough. The drain baffle 15 is preferably inclined slightly toward one side of the refrigerator cabinet 11 so that moisture is carried to that side and is collected in a collecting trough 20 which conveys the moisture, for example, to a suitable drain outside the cabinet.

Figure 2:
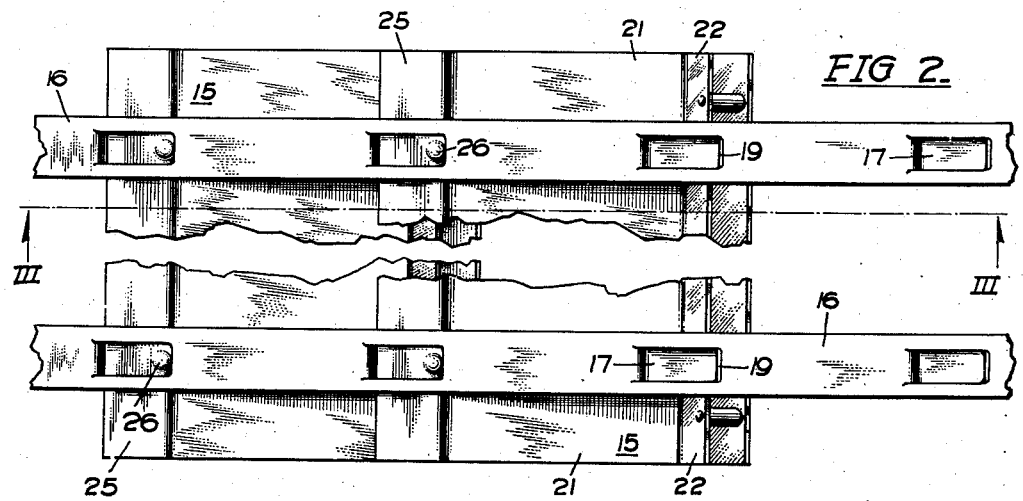
Fig. 2 is a partial plan view of the improved drip collector shown in Fig. 1.
Figure 3:
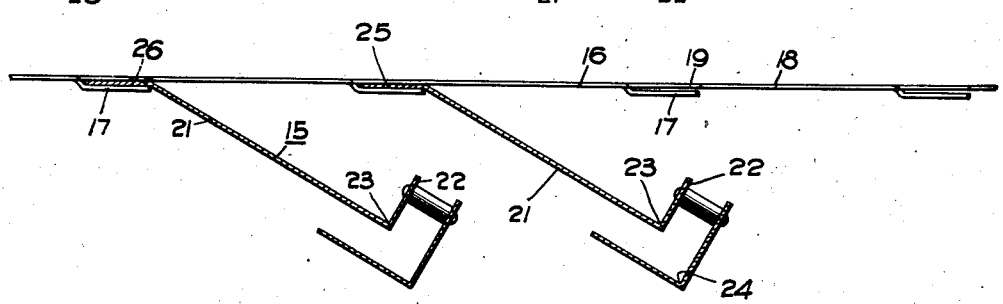
Fig. 3 is a vertical sectional view of the drip collector taken on the line III—III of Fig. 2.

In accordance with the first embodiment of my invention, the improved drain baffle shown in Figs. 1 to 3, inclusive, is constructed in the following manner. One or more supporting members 16 are fastened to the heat insulated cabinet 11 by any suitable means and are provided with downwardly bent flaps 17 which lie parallel to and below the main portion 18 of the supporting member 16. When the flaps 17 are cut out and bent, a plurality of aperatures 19 are formed in the supporting members 16.

Fins 21 are formed of strips of sheet metal disposed at an angle of, for example, 30° as shown in the drawings. The fins are provided at their lower ends with an upwardly bent portion 22 which forms a trough 23. The fins are so spaced that the trough of each fin overlaps vertically with a portion of the next fin so that water falling on the fins 21 must be collected in one of the troughs 23. A second V-shaped trough 24 is supported by the fin 21 below the trough 23 and collects any condensate forming on the underside of the fins 21.

The upper extremity of the fins 21 are provided with a horizontal flange 25 which slides between the downwardly bent flaps 17 and the main body portion 18 of the supporting member 16. A raised button or protuberance 26 is formed on the horizontal flange 25 at each portion thereof which enters and engages the flaps 17.

In assembling the fins 21 onto the supporting members 16 it is only necessary to slide the individual fins under the flaps 17 whereupon the fins 21 are frictionally retained in position. The buttons 26 extend into the openings 19 in the supporting members 16 so that considerable force is required to bend the flaps 17 down sufficiently to again remove the fins, the buttons 26 thereby providing a frictional locking arrangement.

Figure 4:
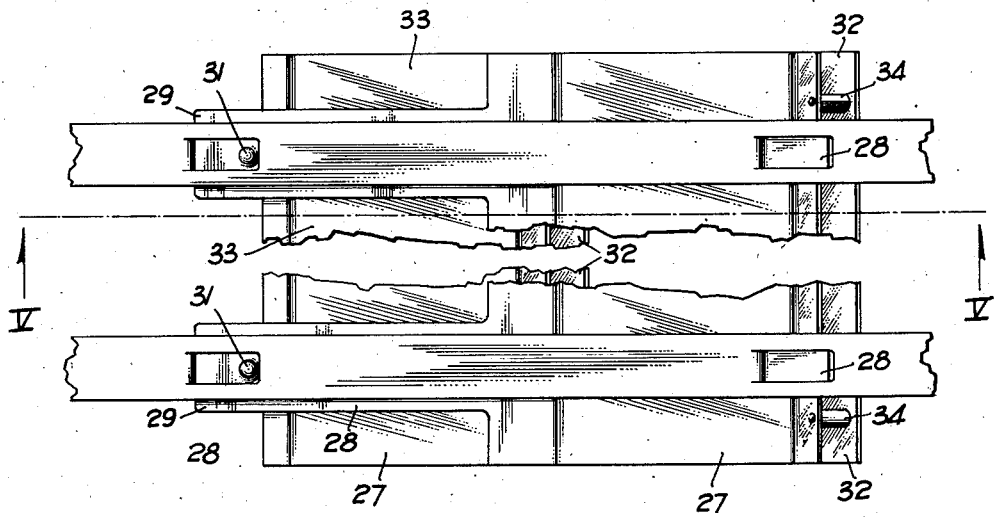
Fig. 4 is a partial plan view of the second embodiment of my invention.
Figure 5:
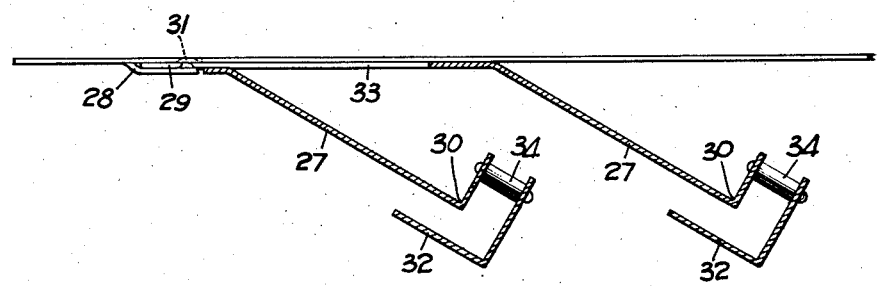
Fig. 5 is a sectional view taken on line V—V of Fig. 4.

Referring to Figs. 4 and 5 for a description of the second embodiment of my invention, it will be noted that two fins 27, having a trough 30 formed at the bottom of each, are retained in position by one flap 28. The two fins 27 are formed into a unitary structure preferably by spot welding the left-hand fin 27 to a long horizontal member 29 which slides under the flap 28 and extends outwardly to the right-hand fin 27. Openings 33 are provided between the horizontal members 29 to afford circulation of air and collection of moisture. As in the former embodiment, the horizontal members 29 are provided with buttons or protuberances 31 for frictional locking. Second collecting trough 32 are supported below the troughs 30 by a heat insulating member 34, as in the first embodiment.

From the foregoing it will be apparent that I have provided an improved drip collector or drain baffle for collecting condensate from refrigerator evaporators and the like wherein individual fins or sets of fins are frictionally retained and locked in position. By utilizing such a construction it is unnecessary to assemble the fins in the drip collectors in the factory, broken fins may be individually replaced, and the manufacture of drip collectors is facilitated because it is only necessary to change the length of the supporting member for any size drip collector desired.

While I have shown my invention in several forms, it will be obvious to those skilled in the art that it is not so limited, but is susceptible of various other changes and modifications without departing from the spirit thereof, and I desire, therefore, that only such limitations shall be placed thereupon as are specifically set forth in the appended claims.

What I claim is:

1. A drip collector for refrigerator evaporators and the like comprising a plurality of individual sets of fins having their lower ends formed to catch drip, each of said sets of fins consisting of at least two fins connected together to form a unitary structure, and means for supporting the fins so that the lower end of each fin overlaps vertically with a portion of a next fin and is spaced therefrom, said means also frictionally retaining each of said sets of fins thereon so that said individual sets of fins are readily attachable to or removable from said supporting means.

2. A drip collector for refrigerator evaporators and the like comprising a plurality of individual fins having their lower ends formed to collect drip and means for frictionally retaining the fins in such a position that each fin overlaps vertically with a portion of a next fin and is spaced therefrom, said means including a sheet metal supporting member extending transversely of said fins, said supporting member having flaps cut and bent to lie substantially parallel to but in a different plane from the main portion of said supporting member, means formed on the fins for frictionally engaging said flaps so that the flaps press against the fins to frictionally retain them in place, and means cooperating between the fins and the supporting member for further frictionally locking said fins in place.

3. A drip collector for refrigerator evaporators and the like comprising a plurality of individual sets of fins having their lower ends formed to catch drip, each of said sets of fins consisting of at least two fins connected together to form a unitary structure and means for frictionally retaining the sets of fins in such position that each fin overlaps vertically with a portion of a next fin and is spaced therefrom, said means comprising a sheet metal supporting member extending transversely of said fins, said supporting member having flaps cut and bent to lie substantially parallel to but in a different plane from the main portion of said supporting member, means formed on each set of fins for frictionally engaging said flaps, so that the flaps frictionally retain the sets of fins in place and further means frictionally locking said sets of fins to said supporting member.

4. A drip collector for refrigerator evaporators and the like comprising a plurality of drip collecting means, each of said drip collecting means including at least one fin and each fin having its lower end formed to collect drip, and means for frictionally retaining the collecting means so that each fin overlaps vertically with a portion of a next fin and is spaced therefrom, said retaining means embodying a supporting member extending transversely of said fins, said supporting member having flaps cut and bent to lie substantially parallel to but in a different plane from the main portion of the supporting member, said cut and bent flaps providing a plurality of openings in said supporting member, means formed on the collecting means for frictionally engaging said flaps, so that the flaps retain the collecting means in place and further means for frictionally locking said drip collecting means to said supporting member.

5. A drip collector as claimed in claim 4 wherein the frictional locking means consists of raised members on said drip collecting means which extend into said openings in the supporting member.

6. A drip collector for refrigerator evaporators and the like comprising a plurality of drip collecting means, each of said drip collecting means including at least one fin and each fin having its lower end formed to collect drip, means for supporting the collecting means so that the lower end of each fin overlaps vertically with a portion of the next fin and is spaced therefrom, said means also frictionally retaining each of said collecting means thereon, so that each collecting means is readily attachable to or removable from said supporting means, and a trough formed below each fin to collect condensate therefrom.

WILLIAM ARDITO.